United States Patent
Birk et al.

(10) Patent No.: US 6,710,918 B2
(45) Date of Patent: Mar. 23, 2004

(54) SCANNING MICROSCOPE

(75) Inventors: Holger Birk, Meckesheim (DE); Rafael Storz, Bammental (DE); Johann Engelhardt, Schoenborn (DE); Kyra Moellmann, Trippstadt (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/882,355

(22) Filed: Jun. 18, 2001

(65) Prior Publication Data

US 2002/0018293 A1 Feb. 14, 2002

(30) Foreign Application Priority Data

Jun. 17, 2000 (DE) .......................................... 100 30 013
Mar. 29, 2001 (DE) .......................................... 101 15 590

(51) Int. Cl.$^7$ ............................................... G02B 21/06
(52) U.S. Cl. ....................................... 359/385; 385/31
(58) Field of Search .................. 359/368, 385, 359/386, 388, 389; 372/92; 385/43

(56) References Cited

U.S. PATENT DOCUMENTS

| | | | | |
|---|---|---|---|---|
| 4,063,106 A | * | 12/1977 | Ashkin et al. | 359/327 |
| 5,796,477 A | | 8/1998 | Teich et al. | |
| 5,862,287 A | | 1/1999 | Stock et al. | |
| 5,995,281 A | * | 11/1999 | Simon et al. | 359/368 |
| 6,002,522 A | * | 12/1999 | Todori et al. | 359/573 |
| 6,052,238 A | * | 4/2000 | Ebbesen et al. | 250/227.11 |
| 6,055,097 A | * | 4/2000 | Lanni et al. | 359/368 |
| 6,097,870 A | | 8/2000 | Ranka et al. | 385/127 |
| 6,154,310 A | | 11/2000 | Galvanauskas et al. | 359/328 |
| 6,178,041 B1 | | 1/2001 | Simon | |
| 6,236,779 B1 | * | 5/2001 | Kafka et al. | 385/31 |
| 6,356,088 B1 | * | 3/2002 | Simon et al. | 250/311 |
| 6,396,053 B1 | * | 5/2002 | Yokoi | 250/234 |

FOREIGN PATENT DOCUMENTS

| | | |
|---|---|---|
| DE | 198 53 669 | 5/1999 |
| DE | 19906757 | 12/1999 |
| DE | 19622359 | 1/2001 |
| EP | 0 495 930 | 4/1999 |

OTHER PUBLICATIONS

Ranka et al.; "Visibile continuum generation in air–silica microstructure optical fibers with anomalous dispersion at 800 nm"; Optics Letters, Optical Society of America, Jan. 1, 2000, pp. 25–27, vol. 25. No. 1.
U.S. patent application Ser. No. 09/880,825, Birk et al., filed Jun. 15, 2001.
U.S. patent application Ser. No. 09/881,046, Birk et al., filed Jun. 15, 2001.
U.S. patent application Ser. No. 09/881,047, Birk et al., filed Jun. 15, 2001.
U.S. patent application Ser. No. 09/881,048, Birk et al., filed Jun. 15, 2001.
U.S. patent application Ser. No. 09/881,049, Birk et al., filed Jun. 15, 2001.
U.S. patent application Ser. No. 09/881,062, Birk et al., filed Jun. 15, 2001.
U.S. patent application Ser. No. 09/881,212, Birk et al., filed Jun. 15, 2001.

* cited by examiner

*Primary Examiner*—Mark A. Robinson
(74) *Attorney, Agent, or Firm*—Foley & Lardner

(57) ABSTRACT

The invention discloses a scanning microscope (1) having a laser (2), which emits a light beam of a first wavelength (5, 43, 53) and is directed onto an optical element (9) that modifies the wavelength of the light beam at least to some extent. Means (16) for suppressing the light of the first wavelength in the modified-wavelength light beam (5, 47, 57) are provided.

39 Claims, 4 Drawing Sheets

SCANNING MICROSCOPE

CROSS REFERENCE TO RELATED APPLICATIONS

This invention claims priority of the German patent applications 100 30 013.8 and 101 15 590.5 which are incorporated by reference herein.

FIELD OF THE INVENTION

The invention relates to a scanning microscope having a laser that emits a light beam of a first wavelength, which is directed onto an optical element that modifies the wavelength of the light beam at least to some extent.

BACKGROUND OF THE INVENTION

In scanning microscopy, a sample is scanned with a light beam. To that end, lasers are often used as the light source. For example, an arrangement having a single laser which emits several laser lines is known from EP 0 495 930: "Laser for confocal microscope". Mixed gas lasers, especially ArKr lasers, are mainly used for this at present.

Examples of samples which are studied include biological tissue or sections prepared with fluorescent dyes. In the field of material study, illumination light reflected from the sample is often detected.

Solid-state lasers and dye lasers, as well as fiber lasers and optical parametric oscillators (OPOs), upstream of which a pump laser is arranged, are also used.

Laid-open patent specification DE 198 53 669 A1 discloses an ultrashort-pulse source with controllable multiple-wavelength output, which is used especially in a multiphoton microscope. The system has an ultrashort-pulse laser for producing ultrashort optical pulses of a fixed wavelength and at least one wavelength conversion channel.

U.S. Pat. No. 6,097,870 discloses an arrangement for generating a broadband spectrum in the visible spectral range. The arrangement is based on a microstructured fiber, into which the light from a pump laser is injected. The wavelength of the pump light is modified in the microstructured fiber so that the resulting spectrum has both wavelengths above and wavelengths below the wavelength of the pump light.

So-called photonic band gap material or "photonic crystal fibers", "holey fibers" or "microstructured fibers" are also employed as microstructured material. Configurations as a so-called "hollow fiber" are also known.

Solid-state lasers, such as e.g. the Ti:sapphire lasers commonly used in scanning microscopy, usually have a folded resonator with x or z geometry, which is formed by two end mirrors and two folding mirrors. The light from a pump laser is in this case injected longitudinally in the resonator through one of the folding mirrors, which are transparent for light at the wavelength of the pump light. In the optically active medium (in the example, Ti:sapphire), the latter converts to another wavelength and leaves the resonator as output light through one of the end mirrors, which is designed to be semitransparent for the output light. Since the resonator mirrors are not fully transparent for the wavelength of the pump light, the output light still contains small fractions of light at the wavelength of the pump light. This more especially causes interference in multicolour fluorescence microscopy, since the sample is not illuminated and excited exclusively with light at the desired wavelength, but also with light at the wavelength of the pump light. This causes undesired fluorescences, artefacts and in the final analysis, since components of the pump light also reach the detector by reflection and scattering, leads to incorrect study results.

All known arrangements for wavelength modification have this disadvantage.

SUMMARY OF THE INVENTION

It is an object of the invention to provide a scanning microscope with a flexible illumination which avoids the illumination of a sample with light of unwanted wavelengths.

The object is achieved by a scanning microscope comprising: a laser that emits a light beam of a first wavelength, an optical element that modifies the wavelength of the light beam at least to some extent and means for suppressing the light of the first wavelength in the modified-wavelength light beam.

The invention has the advantage that the undesired illumination of the sample by light of the first wavelength is avoided.

In a simple configuration, a filter is provided for suppressing the light of the first wavelength. It is preferably designed as a dielectric cut-off filter or as a coloured-glass filter. Especially when using microstructured material, such as photonic band gap material, for modifying the wavelength in such a way as to create a broad spectrum, it is advantageous to configure the filter in such a way, for example by corresponding coating, that the first wavelength is not fully suppressed but rather, within the modified-wavelength light beam, has the same power as the other components of equal spectral width.

In another configuration, the means for suppressing the light of the first wavelength contains a prism or a grating for spatial spectral spreading, downstream of which an aperture arrangement, which transmits only light of the desired illumination wavelength and blocks light that has the first wavelength, is arranged.

The suppression means can be fitted at arbitrary points within the beam path of the scanning microscope. It is particularly advantageous to arrange the suppression means directly behind the optical element, in order to prevent scattering and reflection of the light components of the first wavelength by other optical parts, since such components can reach the detector in this way.

In a preferred configuration of the scanning microscope, the optical element is constructed from a plurality of micro-optical structure elements, which have at least two different optical densities.

A more particularly preferred configuration is one in which the optical element contains a first region and a second region, the first region having a homogeneous structure and a microstructure comprising micro-optical structure elements being formed in the second region. It is also advantageous if the first region encloses the second region. The micro-optical structural elements are preferably cannulas, webs, honeycombs, tubes or cavities.

In another configuration, the optical element includes adjacent glass or plastic material and cavities, and is configured as an optical fiber.

A more particularly preferred alternative embodiment, which is simple to implement, contains a conventional optical fiber having a fiber core, which has a taper at least along a subsection, as the optical element. Optical fibers of this type are known as so-called "tapered fibers". The optical fiber preferably has an overall length of 1 m and a taper over a length of from 30 mm to 90 mm. The diameter of the fiber, in a preferred configuration, is 150 µm outside the region of the taper, and that of the fiber core in this region is approximately 8 µm. In the region of the taper, the diameter of the fiber is reduced to approximately 2 µm. The fiber core diameter is correspondingly in the nanometer range.

In another embodiment, the optical element is a further laser. It may be designed as a solid-state, gas or dye laser, or as an optical parametric oscillator (OPO).

In a particular alternative embodiment, the optical element contains a frequency-multiplication crystal, such as e.g. KDP crystals or LBO crystals.

Another configuration contains a further optical element, which is arranged downstream of the optical element and remodifies the wavelength of the modified-wavelength light beam. In this embodiment, it is particularly advantageous to suppress both the light of the first wavelength and the light whose wavelength was initially modified. Specifically, such a configuration contains, for example, a sequential arrangement of an argon-ion laser, a dye laser and a frequency-doubling crystal. A sequential arrangement of an argon-ion laser, a Ti:sapphire laser and, configured as an optical fiber, a micro-optical structure made of photonic band gap material is particularly advantageous.

The scanning microscope may be configured as a confocal microscope.

BRIEF DESCRIPTION OF THE DRAWINGS

The subject matter of the invention is diagrammatically represented in the drawings and will be described below with the aid of the figures, in which.

DETAILED DESCRIPTION OF THE INVENTION

Figure 1:
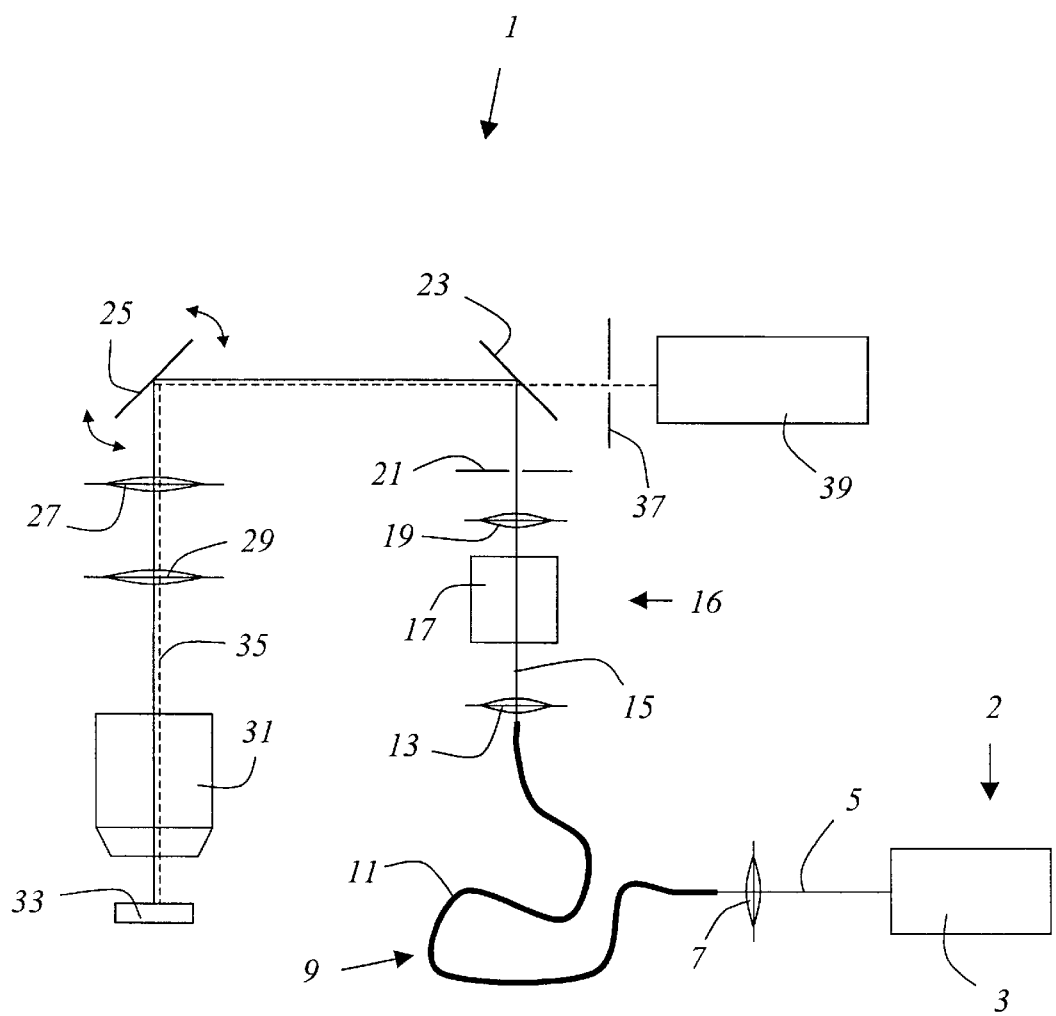
FIG. 1 shows confocal scanning microscope according to the invention.

FIG. 1 shows a confocal scanning microscope 1, which contains a laser 2 for producing a light beam 5 having a first wavelength of about 800 nm. The laser is embodied as a mode-locked titanium-sapphire laser 3. The light beam 5 is focused by an input lens 7 into the end of an optical element 9 for wavelength modification, which is designed as an optical fiber made of photonic band gap material 11. To collimate the modified-wavelength light beam 15 emerging from the optical fiber made of photonic band gap material 11, an output lens 13 is provided. The spectrum of the modified-wavelength light beam is virtually continuous over the wavelength range from 300 nm to 1600 nm, the light power being substantially constant over the entire spectrum; only in the vicinity of the first wavelength of 800 nm is a drastic power increase to be recorded. The modified-wavelength light beam 15 passes through a dielectric filter 17 as suppression means 16, which reduces the power, in the modified-wavelength light beam 15, of the light component in the vicinity of the first wavelength to the level of the other wavelengths of the modified-wavelength light beam. The modified-wavelength light beam is subsequently focused by the lens 19 onto an illumination aperture 21, and then travels via the main beam splitter 23 to the scanning mirror 25, which guides the modified-wavelength light beam 15 through the scanning lens 27, the tube lens 29 and the objective 31, and over the sample 33. The detection light 35, which is represented by dashes in the drawing, leaving the sample 33 travels through the objective 31, the tube lens 29 and the scanning lens 27 back to the scanning mirror 25, and then to the main beam splitter 23, whereupon it is transmitted by the latter and, after having passed through the detection aperture 37, it is detected by the detector 39 which is embodied as a photomultiplier.

Figure 2:
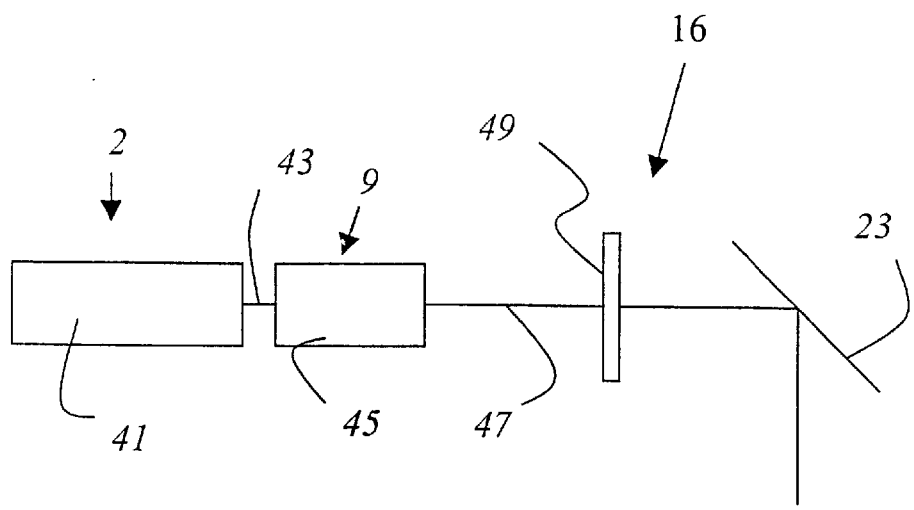
FIG. 2 shows a part of the illumination beam path of a scanning microscope.

FIG. 2 shows the part of the illumination beam path of a scanning microscope as far as the main beam splitter 23. In this exemplary embodiment, a laser 2, which is configured as an argon-ion laser 41, produces a light beam 43 having a first wavelength of 514 nm, which is directed onto a titanium-sapphire laser 45 that is used as the optical element 9 for wavelength modification. The modified-wavelength light beam 47 leaving the titanium-sapphire laser 45 has a wavelength of approximately 830 nm and subsequently strikes the means 16 for suppressing the first wavelength, which is embodied as a colour filter 49 and almost completely filters out the components of the first wavelength, so that the modified-wavelength light beam essentially consists only of light at a wavelength of 830 nm.

Figure 3:
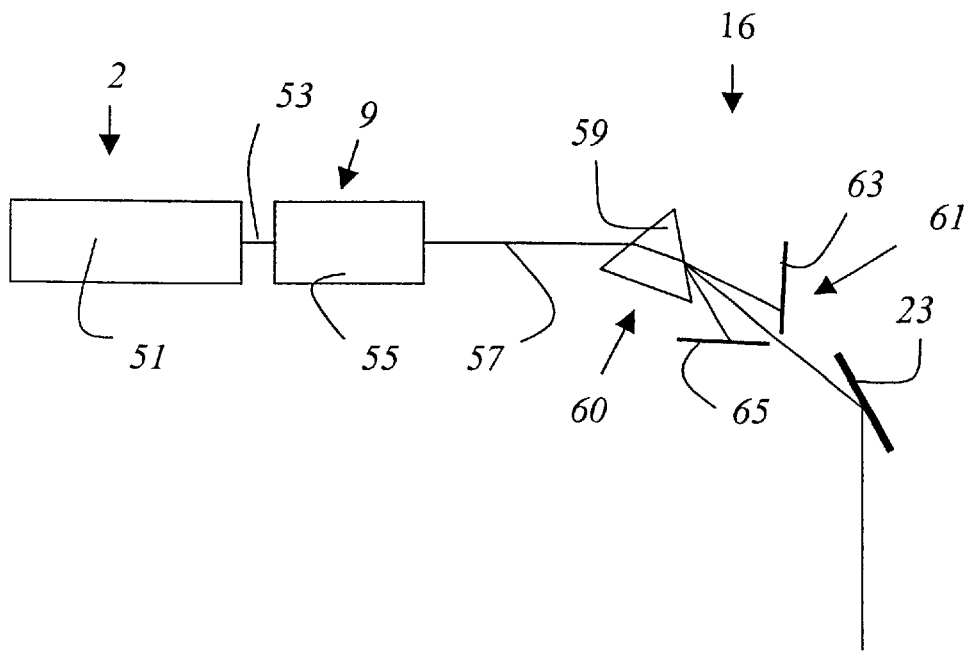
FIG. 3 shows a part of the illumination beam path of another scanning microscope.

FIG. 3 shows the part of the illumination beam path of a further scanning microscope as far as the main beam splitter 23. In this exemplary embodiment, a laser 2, which is configured as an Nd-YAG laser 51, produces a light beam 53 having a first wavelength of 1064 nm, which is directed onto an optical parametric oscillator 55 that is used as the optical element 9 for wavelength modification. The modified-wavelength light beam 57 leaving the optical parametric oscillator 55 contains, in addition to the light at the desired signal wavelength, light at the idler wavelength and light at the first wavelength; it is spread with the aid of a prism 59, as the means for spatial spectral splitting 60, and subsequently strikes an aperture arrangement 61 whose aperture blocks 63, 65 are positioned in such a way that the light at the idler wavelength and light at the first wavelength is blocked, so that the light beam passing through the aperture arrangement 61 essentially contains only light at the signal wavelength.

Figure 4:
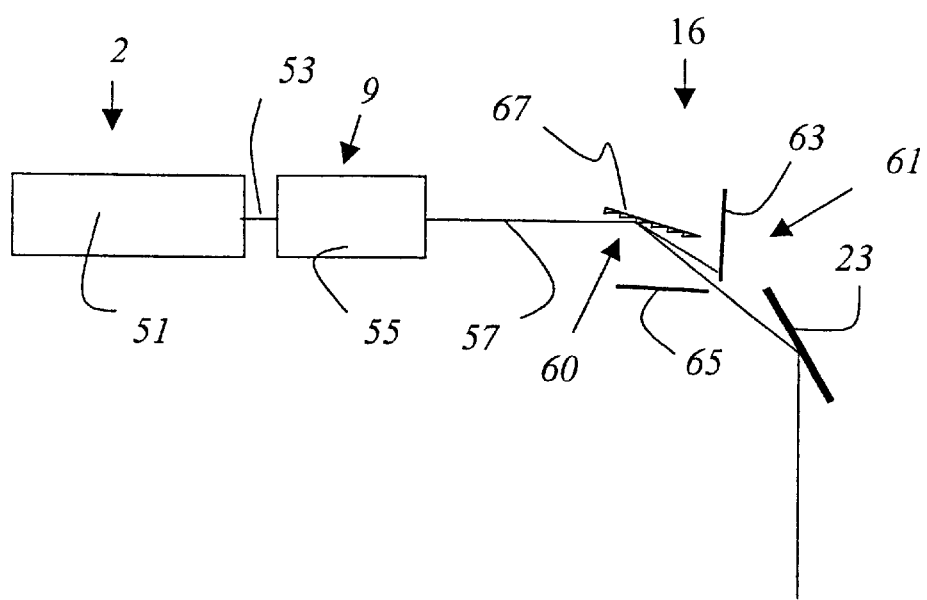
FIG. 4 shows a part of the illumination beam path of a further scanning microscope

FIG. 4 shows the part of the illumination beam path of another scanning microscope as far as the main beam splitter 23, which largely corresponds to the structure shown in FIG. 3. Here, however, a grating 67 is used as the means for spatial spectral splitting 60.

Figure 5:
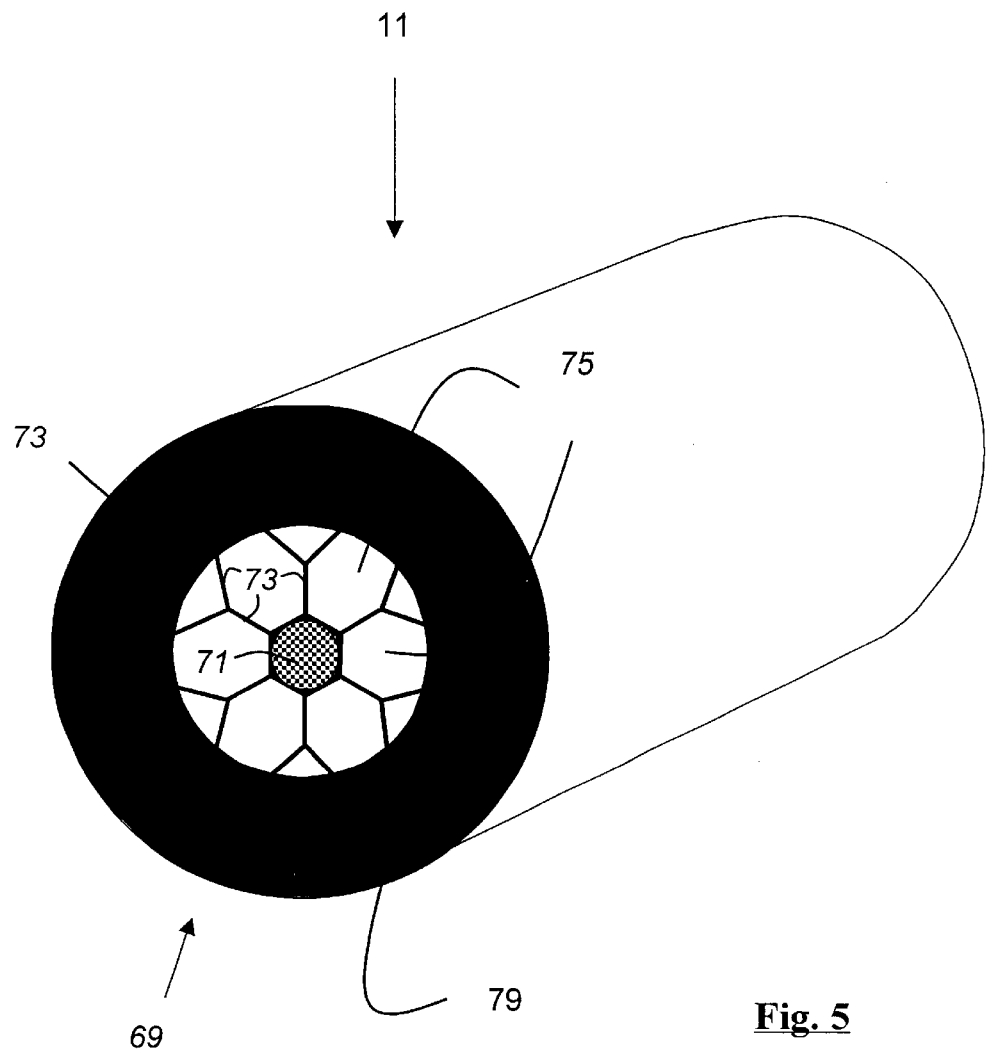
FIG. 5 shows an embodiment of the optical fiber made of photonic band gap material, which has a special honeycombed microstructure 69. The honeycomb structure that is shown is especially suitable for generating broadband light. The diameter of the glass inner cannula 71 is approximately 1.9 µm. The inner cannula 71 is surrounded by glass webs 73. The glass webs 73 form honeycombed cavities 75. These micro optical elements together form a second region 77, which is enclosed by a first region 79 that is designed as a glass cladding.

FIG. 5 shows an embodiment of the optical fiber made of photonic band gap material, which has a special honeycombed microstructure 69. The honeycomb structure that is shown is especially suitable for generating broadband light. The diameter of the glass inner cannula 71 is approximately 1.9 µm. The inner cannula 71

The invention has been described with reference to a particular embodiment. It is, however, obvious that modifications and amendments may be made without thereby departing from the scope of protection of the following claims.

PARTS LIST 1 scanning microscope
2 laser
3 titanium-sapphire laser
5 light beam
7 input lens
9 optical element
11 optical fiber made of photonic band gap material
13 output lens
15 modified-wavelength light beam
16 suppression means
17 dielectric filter
19 lens
21 illumination aperture
23 main beam splitter
25 scanning mirror
27 scanning lens
29 tube lens
31 objective
33 sample
35 detection light
37 detection aperture
39 detector
41 argon-ion laser
43 light beam
45 titanium-sapphire laser
47 modified-wavelength light beam
49 colour filter
51 Nd-YAG laser
53 light beam of a first wavelength
55 optical parametric oscillator
57 modified-wavelength light beam
59 prism
60 means for spatial spectral splitting
61 aperture arrangement
63 aperture
65 aperture
67 grating
69 microstructure
71 cannulas
73 web
75 cavity
77 second region
79 first region

What is claimed is:

1. A scanning microscope comprising: a laser that emits a light beam of a first wavelength, an optical element that modifies the wavelength of the light beam at least to some extent and means for suppressing the light of the first wavelength in the modified-wavelength light beam in the scanning microscope.

2. Scanning microscope according to claim 1, wherein the optical element contains a plurality of micro-optical structure elements, which have at least two different optical densities.

3. Scanning microscope according to claim 1, wherein the optical element comprises a first region having a homogeneous structure and a second region formed by micro-optical structure elements.

4. Scanning microscope according to claim 3, wherein the first region encloses the second region.

5. Scanning microscope according to claim 1, wherein the optical element comprises adjacent glass structures, plastic material, cavities, cannulas, webs, honeycombs or tubes.

6. Scanning microscope according to claim 1, wherein the optical element comprises photonic band gap material.

7. Scanning microscope according to claim 1, wherein the optical element is configured as an optical fiber.

8. Scanning microscope according to claim 1, wherein the optical element comprises a laser.

9. Scanning microscope according to claim 1, wherein the optical element comprises an optical parametric oscillator.

10. Scanning microscope, according to claim 1, wherein the optical element contains a crystal structure for frequency multiplication.

11. Scanning microscope according to claim 1, further comprising at least one further optical element arranged downstream of the optical element, wherein the at least one further optical element modifies the wavelength of the modified-wavelength light beam.

12. Scanning microscope according to claim 1, wherein the means for suppressing includes a filter.

13. Scanning microscope according to claim 1, wherein the means for suppressing contains a means for spatial spectral splitting and at least one aperture.

14. Scanning microscope according to claim 13, wherein the means for spatial spectral splitting comprises a prism.

15. Scanning microscope according to claim 13, wherein the means for spatial spectral splitting comprises a grating.

16. A confocal scanning microscope comprising: a laser that emits a light beam of a first wavelength, an optical element that modifies the wavelength of the light beam at least to some extent and means for suppressing the light of the first wavelength in the modified-wavelength light beam in the confocal scanning microscope.

17. Confocal scanning microscope according to claim 16, wherein the optical element includes photonic band gap material.

18. Confocal scanning microscope according to claim 16, wherein the optical element is configured as an optical fiber.

19. Confocal scanning microscope according to claim 16, wherein the optical element comprises a laser.

20. Confocal scanning microscope according to claim 16, wherein the optical element comprises an optical parametric oscillator.

21. Confocal scanning microscope according to claim 16, wherein the means for suppressing comprises a filter.

22. Confocal scanning microscope according to claim 16, wherein the means for suppressing contains a means for spatial spectral splitting and at least one aperture.

23. A scanning microscope comprising: a laser that emits a light beam of a first wavelength, an optical element that modifies the wavelength of the light beam at least to some extent and optics to suppress the light of the first wavelength in the modified-wavelength light beam in the scanning microscope.

24. A scanning microscope comprising: a laser that emits a light beam of a first wavelength; an optical element that modifies the wavelength of the light beam at least to some extent; and a device adapted to suppress the light of the first wavelength in the modified-wavelength light beam in the scanning microscope.

25. The scanning microscope according to claim 24, wherein the laser is a mode-locked titanium-sapphire laser.

26. The scanning microscope according to claim 24, wherein the first wavelength is 800 nm.

27. The scanning microscope according to claim 26, wherein the optical element that modifies the wavelength of the light beam is adapted to modify the beam to have a spectrum that is substantially continuous over the wavelength range from 300 nm to 1600 nm.

28. The scanning microscope according to claim 27, wherein the power of the modified beam is substantially constant over the spectrum other than in the vicinity of 800 nm.

29. A scanning microscope comprising: a laser that emits a light beam of a first wavelength, an optical element that modifies the wavelength of the light beam to have an output spectrum having components above and below the first wavelength and a means for suppressing the light of the first wavelength in the modified-wavelength light beam in the scanning microscope.

30. The scanning microscope of claim 29, wherein the suppression of the light of the first wavelength in the modified-wavelength light beam reduces the power of light at the first wavelength and of light at wavelengths in the vicinity of the first wavelength of the modified-wavelength light beam to about the level of the other wavelengths of the modified light beam.

31. A scanning microscope comprising: a laser that emits a light beam of a first wavelength, an optical element that modifies the wavelength at least to some extent and a means for suppressing the light of the first wavelength in the modified-wavelength light beam to reduce the power of light at the first wavelength and of light at wavelengths in the vicinity of the first wavelength of the modified-wavelength light beam to about the level of the other wavelengths of the modified light beam in the scanning microscope.

32. A scanning microscope comprising: a laser that emits a light beam of a first wavelength, an optical element adapted to modify the wavelength of the light beam to have an output spectrum having components above and below the first wavelength and a device adapted to suppress the light of the first wavelength in the modified-wavelength light beam in the scanning microscope.

33. The scanning microscope of claim 32, wherein the suppression of the light of the first wavelength in the modified-wavelength light beam reduces the power of light at the first wavelength and of light at wavelengths in the vicinity of the first wavelength of the modified-wavelength light beam to about the level of the other wavelengths of the modified light beam.

34. A scanning microscope comprising: a laser that emits a light beam of a first wavelength, an optical element adapted to modify the wavelength at least to some extent and a device adapted to suppress the light of the first wavelength in the modified-wavelength light beam to reduce the power of light at the first wavelength and of light at wavelengths in the vicinity of the first wavelength of the modified-wavelength light beam to about the level of the other wavelengths of the modified light beam in the scanning microscope.

35. A scanning microscope comprising: a laser that emits a light beam of a first wavelength, an optical element adapted to modify the wavelength of the light beam to have an output spectrum having components above and below the first wavelength and optics adapted to suppress the light of the first wavelength in the modified-wavelength light beam in the scanning microscope.

36. The scanning microscope of claim 35, wherein the suppression of the light of the first wavelength in the modified-wavelength light beam reduces the power of light at the first wavelength and of light at wavelengths in the vicinity of the first wavelength of the modified-wavelength light beam to about the level of the other wavelengths of the modified light beam.

37. A scanning microscope comprising: a laser that emits a light beam of a first wavelength, an optical element adapted to modify the wavelength at least to some extent and optics adapted to suppress the light of the first wavelength in the modified-wavelength light beam to reduce the power of light at the first wavelength and of light at wavelengths in the vicinity of the first wavelength of the modified-wavelength light beam to about the level of the other wavelengths of the modified light beam in the scanning microscope.

38. A scanning microscope comprising: a laser that emits a light beam of a first wavelength; an optical element that modifies the wavelength of the light beam at least to some extent; and a device adapted to suppress the light of the first wavelength in the modified-wavelength light beam, wherein the optical element that modifies the wavelength of the light beam is adapted to modify the beam to have a spectrum that is substantially continuous over the wavelength range having a low end at about 200 nm to about 750 nm below the first wavelength and a high end at about 550 nm to about 1100 nm above the first wavelength in the scanning microscope.

39. The scanning microscope according to claim 38, wherein the power of the modified beam is substantially constant over the spectrum other than in the vicinity of the first wavelength.

* * * * *